May 4, 1937.  H. A. WADMAN  2,079,566
METHOD OF AND APPARATUS FOR CONTROLLING TEMPERATURE
Original Filed April 5, 1930
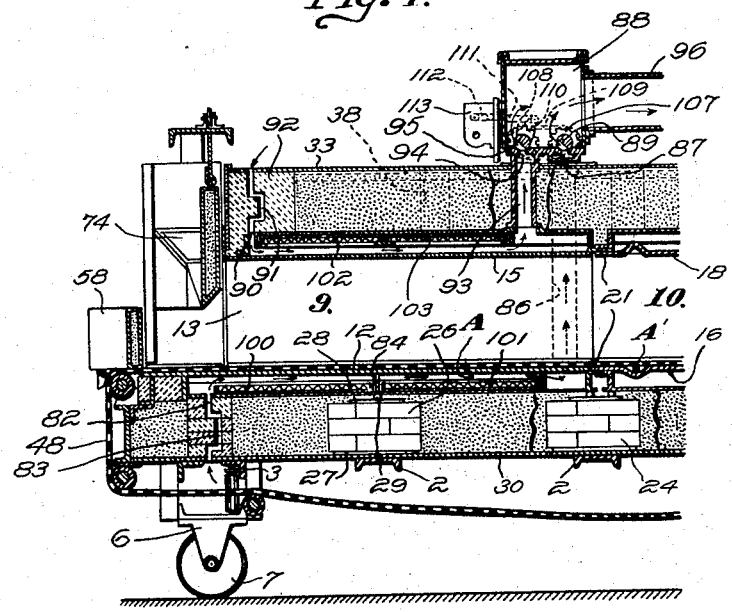
Witness:
Jas. G. White
Inventor
Harold A. Wadman
By Brown & Parlaur
Attorneys Patented May 4, 1937

2,079,566

UNITED STATES PATENT OFFICE 2,079,566

METHOD OF AND APPARATUS FOR CONTROLLING TEMPERATURE

Harold A. Wadman, West Hartford, Conn., assignor to Hartford-Empire Company, Hartford, Conn., a corporation of Delaware Original application April 5, 1930, Serial No. 441,793. Divided and this application August 13, 1932, Serial No. 628,713

6 Claims. (Cl. 236—15)

This invention relates to automatic temperature control and relates both to the method of and apparatus for effecting such control. The present application is a division of my prior and copending application, Serial No. 441,793, filed April 5, 1930 for "Method of and apparatus for annealing glassware." While my parent application relates to a method of and apparatus for annealing glassware, it includes certain temperature control mechanisms and arrangements which are not necessarily restricted to a use in connection with the annealing of glassware, but may be considered in their broader aspects, namely, as method and means for controlling temperatures of any material, whether it be glassware or not, and whether it be moving or stationary.

In the prior art, means and apparatus have been provided for correcting or adjusting temperatures of various materials in response to the temperature of the material which is to be regulated and in an automatic manner. Such prior art temperature regulation has included continuous progressive correction of the temperature as long as correction is needed and has also included intermittent temperature correction in which correction is made at spaced intervals separated by intervals in which no correction is made even though further correction may be required. Neither of these methods, and the apparatus employed according to such methods, have been wholly satisfactory as the continuous manner of correct temperature in many cases has a tendency to overrun, so that the actual temperature of the material wanders from one side to the other of the desired temperature. In the use of intermittent correction in the prior art, it has been found that this method of regulation has been slow in its action, especially at such times as the actual temperature of the material to be regulated is a substantial amount different from the desired temperature.

Among the objects of the present invention, therefore, is to provide a method and apparatus of temperature control which will overcome the difficulties of the prior art in that temperature correction is made intermittently when the differences between the actual temperature of the material to be regulated and the desired temperature are relatively small, and continuous when those differences are relatively larger. In this way, my present method and apparatus include the advantages of both the intermittent and continuous types of temperature regulation while not including the disadvantages of either.

A further object of the present invention is to provide apparatus for and a method of temperature regulation of the character as above set forth applicable to the so-called "duplex" temperature regulation disclosed for the first time in my prior Patent No. 1,802,991, granted April 28, 1931. According to the disclosure of this patent the temperature of a moving mass of material is regulated in response to two thermostats, one of which is subject partially to the temperature of the material and also to some extent at least to the temperature created by the temperature affecting means, and the other of which is positioned further along the course of movement of the material and subject predominantly to its temperature the second thermostat being used to adjust the range in which the first operates. It is a specific object of this invention to provide a method and means by which this range adjustment will be intermittent for small variations or differences between the temperature at the second thermostat and its predetermined adjustable temperature range and continuous for larger ones.

Other objects and advantages of the present invention will become apparent from a reading of the following specification and sub-joined claims when taken in connection with the accompanying drawing, in which:

Figure 1 is a view in fragmentary vertical longitudinal section of the ware-entering end of a glass annealing lehr to which temperature regulating means embodying my present invention are applied; and Fig. 2 illustrates in simplified form a system of electric circuits by which temperature regulation may be effected according to my present invention.

Referring first to Fig. 1, wherein is illustrated a portion of the lehr to which my invention may be applied, the lehr is constructed of a structural metal frame work including the longitudinally extending channel members (not shown) one at each side thereof which are tied together by a plurality of cross channels, as illustrated at 2 and 3. The cross channels 2 serve to support the inner tunnel as will be hereinafter described. The channels 3 are disposed at the points of connection of the longitudinally extending channels, a plurality of which are used for supporting the entire lehr, the channels 3 being provided with brackets 6 bearing wheels 7 by which the movement of the lehr as a whole is facilitated. The lehr tunnel is constructed of a plurality of sections arranged in end to end position, each section of which is independently expansible and is supported by the structural frame work, above referred to, without the interposition of material of high heat conductivity, this support being preferably of a type similar to that disclosed in the patent granted to myself and one A. W. Russell, No. 1,827,673, granted October 13, 1931, which disclosed the inner metal tunnel of a lehr supported solely through the interposition of heat insulating material from an outer relatively rigid metallic support. The portion of the lehr shown in Fig. 1 includes section 9, and a portion of section 10, there being a plurality of sections as disclosed in my parent application, Serial No. 441,731, above referred to. Section 9, the first section, comprises an inner tunnel built up of a metallic bottom member 12, metallic side members as illustrated at 13, and a metallic top member 15, which are preferably bolted together or which may be secured together in any other suitable or desired manner. Section 10 includes a metallic bottom member 16 and a metallic top member 18, secured together in the same manner as the members of section 9. Means are provided intermediate the contiguous ends of the sections 9 and 10 for permitting independent expansion thereof, such means being indicated generally at 21. The sections of the inner tunnel may be supported upon spaced piers of insulating material, such as insulating bricks, certain of which are illustrated at 24 and 26. These piers comprise one or more heat insulating bricks or blocks of suitable strength to furnish the necessary support for the tunnel sections. The piers are in turn supported upon suitable metallic plates as 27, which are disposed above the cross members, as illustrated at 2. Means are provided for permitting relative movement between the piers and the inner tunnel sections, including plates as shown at 28, the inner sections being carried on rollers 29 disposed between the plates 28 and the tunnel sections. Thus, the tunnel sections may move longitudinally of the lehr with respect to the piers under the influence of heat expansion. The tunnel sections are preferably surrounded by a metallic casing, as illustrated at 30 below the tunnel and 33 at the top. The remaining space intermediate the inner and outer tunnel casings is preferably filled with loose heat insulating material, such for example as kieselguhr, this material being indicated by the stippling in Fig. 1. Suitable spacing blocks may be inserted between the lateral sides and the top portions of the inner tunnel sections, one of which is illustrated in dotted lines at 38. Ware may be conveyed through the tunnel upon an endless flexible metallic apron, preferably of woven wire, this apron being illustrated in Fig. 1 at 48, and being drawn slowly through the tunnel from left to right as seen in that figure by mechanism (not shown), but which may be the same as, or similar to, that disclosed in the patent to Mulholland, No. 1,560,481, granted Nov. 3, 1925.

Gate members may be provided adjacent to the entrance end of the tunnel for minimizing drafts blowing either into or out of the tunnel and to prevent heat losses from the interior of the tunnel. Such members include a lower member shown at 58 and an upper member shown at 74. These members may be constructed and arranged for movement and/or adjustment in the manner described in my parent application, Serial No. 441,793, above referred to. It will be understood, however, that a minimum opening is left to provide the necessary space for the insertion of articles into the lehr onto the belt 48 thereof, while at the same time provision is preferably made for opening the gates wide to permit access to the interior of the lehr tunnel when desired.

In the lehr disclosed in my parent application, Serial No. 441,793, the first zone or portion of the tunnel is used for the purpose of preconditioning the ware, that is, either positively supplying heat to it or positively abstracting heat from it, as may be necessary to bring the ware from its entering temperature up or down to the desired temperature at which the ware is to be held for the release of permanent strains or the "soaking" temperature. It is thought, therefore, desirable at this time to set forth the details of the construction of the temperature affecting means for alternatively adding or abstracting heat to or from the lehr in order to serve as a basis for the disclosure of the temperature control system, per se, at least to the extent that such structure is illustrated in Fig. 1 of the present drawing. The portion of the tunnel shown in Fig. 1 is that used for the positive supplying or abstracting of heat to or from the ware and reference is made to this figure for the description of this portion of the construction and its operation.

The bottom member 12 of the first section 9 is hollow and forms a flue through which cooling air may be passed for cooling the bottoms of articles on the belt 48 as desired. For this purpose the member 12 is provided with an air inlet opening 82 formed as an elongate slot extending transversely of the lehr adjacent to the entrance end thereof and on the underside of the member 12. The opening 82 communicates with the atmosphere through a zigzag passage 83 extending down through a suitable block or blocks disposed between the underside of the member 12 and the bottom 30 of the outer casing. The loose insulating material between the tunnel and outer casing is thus prevented from passing into the inlet passage 83. The zigzag arrangement of the passage 83 provides for breaking joints in the bricks (when a plurality are used) through which this passage extends, and also tends to prevent the ingress of foreign material into the flue formed in the member 12, and more particularly hinders egress of heated air when the flue is not operating as a cooling flue. The member 12 is preferably partially subdivided into a plurality of sections by at least one partial partition, as shown at 84, which tends to keep the cooling air in close contact with the upper wall of this member, which is also the lower wall or floor of the tunnel, this insuring the effectiveness of the cooling. For conducting the cooling air out of the interior of the member 12, it is provided at the end remote from the entrance end of the lehr with laterally extending passages which terminate in upwardly extending passages 86 communicating with a transverse header 87. Communication between the transverse header and the wind box 88 is controlled by a transversely extending damper member, which in the present case comprises a cylindrical rod 89 having cutout segments and a suitable cylindrically formed seat for such rod. The means for controlling the position of the damper member 89 will be hereinafter described.

The upper or roof member 15 of the section 9 is hollow to form a flue, as is the bottom member 12, and is similarly provided with an air inlet opening 90 communicating with the atmosphere through a zigzag passage 91 formed in a suitable block or heat insulating structure 92. This upper muffle flue is similar in many respects to the lower flue forming member 12, above described, but is somewhat shorter due to the front gate arrangement illustrated. It is further desirable in most instances that the cooling at the top be less than that at the bottom due to the fact that most glass articles placed in an annealing lehr are hotter at the bottom than at the top, so that greater cooling at the bottom is required to bring all portions of such articles to the same temperature. Air is withdrawn from the interior of the member 15 through one or more upwardly extending exhaust flues 93. These flues communicate at their upper ends with a transverse wind box 94. Communication between the transverse wind fox 94 and the wind box 68 is controlled by a damper member 95, preferably similar in construction to the damper member 89.

Air is withdrawn from the wind box 88 through an outlet conduit 96, which communicates with a suitable suction fan not shown in the accompanying drawing, but illustrated and described in detail in my parent application above referred to. Thus the rate of cooling adjacent to the entrance end of the lehr and within the tunnel may be accurately controlled by the position of damper members 89 and 95. Also the proportional cooling of the upper and lower portions of such ware may be controlled by the relative position of these dampers.

For supplying heat to the interior of the muffle flues in members 12 and 15, I preferably provide suitable electric heating elements, which in the present instance are shown diagrammatically at 100 and 101 in the lower flue within the member 12 and at 102 and 103 in the upper flue in the member 15. These elements preferably comprise resistance type electric heating elements and are preferably located in trays, which may be removed laterally from the bottom and top members 12 and 15 respectively. These trays including the heating elements are preferably spaced from the sides of the members 12 and 15 nearer the tunnel and specifically the trays including elements 102 and 103 in the upper flue within the member 15 are for this purpose supported in suitably arranged brackets similar to drawer slides, so as to space the heating elements from the underside of the top member 15, whereby to provide a passage for cooling air immediately adjacent to the side of the flue nearer the tunnel, whereby the cooling is made more effective.

Electric current is conducted to the heating elements 100 to 103 inclusive by suitable flexible conductors providing for relative expensive movement between the inner and outer tunnel portions, the details of these flexible connectors being illustrated in my parent application above referred to, but not being shown in the instant drawing. Thus, by passing current through some or all of the heating elements 100 to 103 inclusive, heat is supplied to the interior of one or both of the relatively short muffle flues and thence to the ware on the conveyor belt adjacent to and within the entrance end of the tunnel, which will serve to bring too cool ware up to the desired "soaking" temperature prior to subjecting it to annealing temperatures in subsequent portions of the lehr.

While it may be feasible to provide manually operated means for controlling the positions of damper members 89 and 95 to control the draft through the upper and lower short muffle cooling flues and also to provide manually operated switches and/or current controlling means such as rheostats for the electric heating elements 100 to 103 inclusive, I prefer to employ completely automatic means for accomplishing both of these purposes in response to glass temperatures and in a peculiar and novel manner. In particular, I prefer to control the alternative heating and cooling means in response to an automatic control system responsive to glass temperatures, the system being in many respects similar to that shown in my prior Patent 1,802,991, granted April 28, 1931.

In accomplishing these objects I preferably employ a construction in which damper members 89 and 95 are interconnected for simultaneous operation either to turn on or turn off the draft to both upper and lower muffle cooling flues simultaneously. For this purpose the damper members 89 and 95 are provided with sprocket wheels 107 and 108 respectively, which are angularly adjustably secured thereto in any suitable manner as by suitable set screws (not shown), these sprocket wheels being connected for simultaneous movement by a sprocket chain 109 passing therearound. For operating the two damper members, I provide on one of the shafts, as on the member 95, a crank 110 which is pivotally connected by the link 111 with a crank 112 arranged to be rotated by a motor 113. The crank 112 is preferably provided with a radial slot (not shown), to any point of which the link 111 may be pivotally connected, whereby the angular throw of the damper members 89 and 95 may be varied. This construction in combination with the adjustability of the sprockets 107 and 108, with respect to the damper members 89 and 95 to which they are adjustably fixed respectively, provides for the establishment of independently adjustable drafts in both the top and bottom flues respectively. The drafts in both upper and lower flues are, however, preferably turned fully on or fully off simultaneously, but the "on" position in each case is variable as to the amount of draft permitted. The effective length of the crank 112 is always less than that of the crank 110 to prevent the latter ever reaching a dead center position.

It may in some instances be desirable to use a motor for operating these damper members by rotation of the crank 112 in which a maintaining switch is used for maintaining the motor in operation during the period that the crank 112 makes a one-half revolution, in combination with a cut-off switch effective to cut off the motor after this one-half revolution has been made and until a separate and independent circuit is subsequently completed at which time another half revolution of the crank 112 will take place. In the present instance, I have chosen to illustrate a motor of reversible character and provided with suitable limit switches effective to prevent the rotation in one direction or the other after the crank 112 has been rotated through 180° in each direction and also in combination with a maintaining switch of any suitable character, so that even if the current to the motor to operate it in one direction or the other be cut off by the automatic means before the motor has turned the crank 112 through 180°, the motor will be maintained in operation until this 180° rotation of the crank 112 has been completed, at which time the motor will be stopped by a suitable limit switch. The maintaining switch and limit switch for the motor 113 have not been shown in the diagrammatic representation of the circuit in Fig. 2 as these are common means well known in the art and no invention is predicated upon this particular use of such means. Also in the diagram (Fig. 2) means to prevent arcing at the contact points and chattering of the contacting member have not been specifically shown, although such means may, and preferably are used in practice in order to provide for positive making and breaking of the several circuits and to prevent "hunting". Furthermore, the circuits have been split up as far as possible to render them simple and in order that they may be easily understood.

As shown in Fig. 2, the heating elements 100, 101, 102 and 103, are connected to line wires 114 and 115. A relay operated switch is interposed in the wire 115, which is effective to break the circuit to all of the heating elements simultaneously, the switch being generally indicated at 116 and being illustrated as a bridging member movable toward and away from the switch points to which the two portions of wire 115 are connected in response to the energization and deenergization of solenoid coil 117. When current is caused to flow through the coil 117, the bridging member of the switch 116 will be moved to bridge the gap between the portions of wire 115 and current will pass through the heating elements 100 to 103 inclusive thus supplying heat to the interior of the upper and lower muffles.

The motor 113 is shown diagrammatically in Fig. 2 and is indicated as reversible by the double ended arrow within the circle. The motor may be of the type which is provided with two field coils, one for operating it in either direction, one end of each of the field coils being connected by common wire 118 to one side of the main line. The other ends of each of the field coils of the motor 113 may be connected by wires 119 and 120 respectively with contact points 121 and 122 positioned at relatively opposite points adjacent to the thermostatically operated contact member 123.

The other side of the main supply line used for operating the motor 113 may be connected by a wire 124 in any desired manner as through a suitable flexible pigtail to the contact member 123, whereby when the contact member is moved to the left or right, as shown in Fig. 2, a circuit will be completed through the motor in one direction or the other as hereinafter more specifically to be described. The contact member 123 is further provided with a suitable bridging member 125 adapted to bridge the gap between contact points 126 and 127 upon movement of the contact member 123 to the right as seen in Fig. 2. Contact point 126 is connected by a wire 128 to one side of the solenoid coil 117. Contact point 127 is connected by wire 129 to some suitable source of power, here generally indicated as a battery 130, the other terminal of this source of power or battery being connected to the other side of the solenoid coil 117 by a wire 131.

The contact member 123 is adapted to be moved by a thermostat A positioned as indicated in Fig. 1 in the flue space within the lower member 12 and directly above the heating element 101, so as to be responsive jointly to the temperature within the member 12, which is affected either by the temperature of the heating elements 100 and 101 or by the draft of air passing through this member and also to some extent to the temperature of the glassware upon the conveyor 48 adjacent to the thermostat.

The thermostat A is preferably of the type disclosed in the U. S. patent to Mulholland and Honiss, No. 1,866,366, granted July 5, 1932, which comprises a differential expansion thermostat including an outer tube of relatively high expansive material, such as nickel, and a rod or inner tube of material of little or no expansivity, such as fused silica, these members being fastened together at one end and being allowed to expand independently of each other, as diagrammatically illustrated in Fig. 2. In this figure a casing 132 is shown which is preferably secured to one side of the lehr. To this casing is secured the tub 133, such as the nickel tube above referred to, and within this tube is a rod or smaller tube 134, which may be of fused silica, the tube and rod 133 and 134 being fastened together at their inner ends (to the left as seen in Fig. 2 and in a manner not shown). These elements 133 and 134 extend transversely of the lehr and preferably are of a length substantially the same as the width of the lehr tunnel plus the width of the insulation at one side thereof. The member 134 bears against the slidingly mounted rod 135, which is spring pressed toward the member 134 by means of a helical compression spring 136 extending between one side of the member 132 and a collar 137 secured to the rod 135. A member 138 is threaded on the rod 135 and is provided with a stud 139 bearing against the contact member 123, which member is either flexible or pivoted at or near the box member 132. Any suitable means, such as the tension spring 123ᵃ extending between the member 123 and a suitable fixed anchorage 123ᵇ, may be used to retain the member 123 in engagement with the stud 139 and to move it to the right, as seen in Fig. 2, when such action is permitted by the position of the stud 139. The lower end of the member 138, as shown in Fig. 2, is slidingly received in a guide 140 which prevents its rotation. Thus when the thermostat cools off and more heat is required at the point at which the thermostat is located, the tube 133 will contract causing the member 134 to move the rod 135 to the right, as seen in Fig. 2, against the compression of the spring 136. This will also move the stud 139 to the right, permitting the member 123 to move to the right under the influence of the spring 123ᵃ. If the thermostat is too highly heated, the reverse action will take place, and the spring 136 will cause the movement of the rod 135 to the left, which movement will be transmitted through the member 138 and stud 139 to the member 123, which will be moved to the left against the action of the spring 123ᵃ, which tends at all times to move it to the right and to retain it against the stud 139.

The operation of the system thus far described is as follows: Assuming an initial condition of the apparatus and position of parts in which the member 123 is in neutral, so that it does not contact with any of the contact points arranged adjacent thereto, the damper members 89 and 95 are in a position permitting the flow of cooling air through the upper and lower muffle flues and the current to the heating elements is off due to the fact that the switch 116 is open. If, under these circumstances, the ware is too cool and the thermostat A starts to cool off, the tube 133 will contract causing a movement of the rod 135 to the right, as seen in Fig. 2, which as above described will cause the contact element 123 to move to the right. The first action takes place when the contact member 123 is moved to such a point that the contact spring 141 secured thereto, which is connected with wire 124, engages the contact point 122. A circuit is completed as follows: wire 124, contact spring 141, contact point 122, wire 120, motor 113, and wire 118, back to the line. This circuit serves to start the operation of the motor 113 in such a direction as to close the damper members 89 and 95, due to a 180° rotation of the crank 112. It will be understood that even if the movement of the contact member 123 should break the connection between contact spring 141 and contact point 122 at any time before the crank 112 has completed its half revolution, the circuit to the motor 113 to move it in the direction to close the dampers will be maintained by a suitable maintaining switch and will be positively cut off by a suitable cut off or limit switch after the motor has rotated the crank 112 through 180°. The result of this action is that the draft will be cut off through the upper and lower muffles.

If the temperature at the thermostat A is still too cool, so that the contact member 123 is moved further to the right, as above described, the spring member 141 will yield sufficiently to permit such movement and the bridge member 125 will be moved to connect the contact points 126 and 127. A circuit will then be completed as follows: From the battery 130, through wire 129, contact point 127, bridge member 125, contact point 126, wire 128, solenoid coil 117, and wire 131, back to the battery 130. Thus, the solenoid coil 117 will be energized to close the switch 116 and connect the heating elements 100, 101, 102 and 103 with the line wires 114 and 115, which will supply heat to both the upper and lower muffles simultaneously.

When the thermostat A has been sufficiently heated, so that the tube 133 again expands and the contact member 123 starts moving to the left from its extreme right hand position as seen in Fig. 2, under the influence of the mechanism above described, the first occurrence is the breaking of the circuit including bridging member 125 and contact points 126 and 127, which will cause the de-energization of the coil 117, this in turn causing the opening of the circuit to the heating elements 100, 101, 102 and 103, thus cutting off the further supplying of heat to the glass.

Upon further movement of the member 123 to the left as seen in Fig. 2, due to the continued heating up of the elements of thermostat A, the contact will be broken between the spring 141 and the contact point 122. When this occurs, nothing further happens as presumably the motor 113 has ceased to operate in a direction to close the damper members 89 and 95. Even if this movement has not been completed, the action of closing the dampers will be continued and completed by the maintaining switch and cutoff switch for the motor 113, in the manner above described.

Assuming now that the thermostat A is further heated up, so that positive cooling of the glass is called for, the contact member 123 will be moved further to the left, as seen in Fig. 2, until the contact spring 142 engages the contact point 121. At this time a circuit will be completed from the main current supply line, through wire 124, contact spring 142, contact point 121, wire 119, motor 113, and wire 118, back to the line. The motor 113 will thus be actuated in the opposite direction from that above described and will be effective to rotate the crank 112 through 180° in the opposite direction, which will serve to open the damper members 89 and 95 through the mechanism above described. It will be understood that the maintaining switch and limit switches are similarly effective to cause a continued movement of the motor sufficient to move the crank 112 through 180° and there to stop such movement. Thus the draft has again been started through the muffle flues, so that from the standpoint of the lehr, the original conditions have been restored.

If now the thermostat A commences to cool again, the contact member 123 will be moved back toward its neutral position, and in the course of such movement, contact will be broken between the contact spring 142 and the contact point 121. This will have no effect upon the action of the motor 113 due to the use of the maintaining switch above described and the cutoff switch, so that this breaking of the circuit by movement of the contact member 123 to neutral will merely restore the original conditions of the automatic control means thus far explained.

With the contact member 123 in the neutral position, the heating elements are always inactive and the damper members 89 and 95 may be either open or closed to establish or cut off draft through the cooling flues within the members 12 and 15 according as the contact member 123 was to the left or right respectively of its neutral position immediately prior to its being at the neutral position.

Thus far I have described what may be termed "primary" circuit for operating the alternative heating or cooling control. I provide also what may be termed a "secondary" circuit or a circuit for controlling the primary circuit preferably in a manner similar to that disclosed in my prior Patent 1,802,991 above referred to. It will be understood from the foregoing description that the primary circuit will control the heating or cooling in response to variations of the temperature at the position of the thermostat A from a predetermined temperature range, the range being that in which the thermostat A is adapted to operate and being in practice perhaps 2 or 3 degrees. This range, however, may be changed or varied by varying both limits thereof similarly, that is in the same direction and in corresponding amounts. In practically accomplishing this variation, I prefer to vary the relative positions of the rod 135 and member 138 by rotating the rod 135 with respect to the member 138. This is preferably accomplished automatically as in my prior Patent 1,802,991 above referred to by means of a motor 143, which is suitably geared to the rod 135 as diagrammatically indicated in Fig. 2, although in practice a relatively high gear reduction is used.

For operating the motor 143 in one direction or the other I preferably employ an automatic means responsive to thermostat A', which, as shown in Fig. 1, is located in a recess in the floor plate of section 10 at a point remote from the influence of the heating or cooling means of section 9 and also so as not to be influenced by the main heating means (not shown) which supply heat to the lehr. The thermostat A' is thus adapted to be responsive predominantly to the temperature of the glassware adjacent thereto. Thermostat A' is preferably of the same type as thermostat A and is adapted to operate a contact member 144 in the same manner that thermostat A operates contact member 123, the essential difference being, however, that the range for thermostat A' is manually adjustable by a hand wheel 145 secured to the threaded shaft 146, which corresponds to the rod 135 of the thermostat A. In connection with thermostat A' and motor 143, a cam mechanism is preferably used comprising cams 147, 148 and 149 mounted upon a common shaft, these cams being arranged to be driven by a motor 150. Suitable speed reducing means are preferably interposed between the motor 150 and the common shaft on which cams 147, 148 and 149 are mounted, and preferably these cams are rotated at a speed, which, while it may be variable, is preferably of the order of one revolution in five minutes. It will be understood, however, that this speed may be changed by varying the gear train interposed between the armature of motor 150 and the common shaft on which the cams are mounted. The particular speed referred to is, however, chosen as approximately that of a single revolution of the cams in about the time it takes the ware to pass between the points opposite thermostats A and A' respectively plus the time required for heat to be transmitted from the heating elements 100, 101, 102 and 103 to the ware and from the ware to thermostat A' to influence this thermostat. The contact member 144 is preferably provided with pairs of spring contact members 151—152, 153—154, 155—156, all of which contact members 151 to 156 inclusive, are in effect connected together due to the construction of the contact member 144 of some conducting material. Current is supplied to the secondary circuit from line wires 157 and 158. The wire 158 is connected by a wire 159 with the conducting contact member 144, so that each of the contact springs 151 to 156 inclusive is at all times connected to wire 158. Contact springs 151 to 156 inclusive respectively are arranged to make contact with points 160, 161, 162, 163, 164 and 165. One side of the motor 150 is connected by a wire 166 with one side of the line, wire 157; and the other side of the motor 150 is connected by a wire 167, with the wire 168, which communicates with both contact points 164 and 165 at one end and with one contact 169 of the maintaining switch controlled by cam 149 at its other end. The other contact 170 of this maintaining switch is connected directly to line wire 158. The cam 149 has a notch at one portion thereof into which the movable member 171 of the maintaining switch may drop by gravity or under the influence of a suitable spring (not shown) as desired. Each of the cams 147 and 148 is provided with a protrusion, which is adapted to be opposite their respective cam followers almost immediately after the cams 147, 148 and 149 have been rotated so that the member 171 rides out of the notch in cam 149. Cam 147 controls a switch including members 172 and 173 and cam 148 controls a switch including members 174 and 175. One side of each of these switches controlled by cams 147 and 148, to wit, switch contacts 173 and 175, are connected with points 162 and 163 respectively by wires 176 and 177. The motor 143 is as above stated a reversible motor and may include two field windings, one side of each of which is connected by a common wire 178 with one side of the line, wire 157. The other sides of each of the field windings of motor 143 are connected respectively by wires 179 and 180 with contact points 160 and 161 respectively; and the wires 179 and 180 are connected respectively by wires 181 and 182 to the other sides of the switches controlled by cams 147 and 148, that is switch contacts 172 and 174 respectively.

Considering now the operation of the secondary circuit as controlling the motor 143 to adjust the range of the primary circuit, and starting with the contact member 144 in neutral, so that no contacts are made on either side thereof, the motor 150 is stopped in a position in which the cam follower 171 of the maintaining switch is in the notch in cam 149, and the protrusions on cams 147 and 148 are not opposite their respective cam followers, so that the switches including members 172—173 and 174—175 are both open, and assuming that the glass is cooling down, so that the temperature at the point at which thermostat A' is located is falling below the predetermined set range for this thermostat, which will result in a movement of the contact member 144 to the right, as seen in Fig. 2. The first occurrence incident to the movement of contact member 144 to the right is that the contact spring 154 will engage contact point 163, which will connect the wire 158, through wire 159, contact member 144, contact spring 154, contact point 163, and wire 177 with the switch point 175; but inasmuch as this switch is open at this point, no action will occur.

Upon further movement of the contact member 144 to the right as seen in Fig. 2, due to the continued cooling of the thermostat A', the next contact to be made is that between the contact spring 156 and contact point 165. At this time a circuit is completed as follows; from one side of the line, wire 158, through wire 159, contact member 144, contact spring 156, contact point 165, wire 168, wire 167, motor 150 and wire 166 back to the other side of the line, wire 157. This will start the operation of the motor 150 to rotate the cams 147, 148 and 149 in the direction of the arrows shown in Fig. 2. As soon as contact member 171 has been moved by the movement of the cam 149 to close the maintaining switch between contacts 169 and 170, a maintaining circuit through the motor 150 is completed as follows: from the wire 158, through contact 170, contact 169, a part of wire 168, wire 167, motor 150, and wire 166 back to the other side of the line, wire 157. This circuit will maintain the motor 150 in operation until the cams have made a complete revolution to bring the notch in cam 149 opposite the cam follower 171, whether or not the contact is broken between the contact spring 156 and contact point 165 to open the motor circuit as first established.

Also, as soon as the cams 147, 148 and 149 have commenced to rotate, the follower of cam 148 rides up on the protrusion of that cam, causing the engagement of switch contacts 174 and 175, which will complete a circuit through the motor 143 to operate it in one direction as follows: starting with one side of the line, wire 158, through wire 159, contact member 144, contact spring 154, contact point 163, wire 177, contact 175, contact 174, wire 182, wire 180, motor 143, and wire 178 back to the other side of the line, wire 157. The motor 143 will thus be actuated in one direction as long as the contact points 174 and 175 are retained in engagement, which time will be subject to the configuration of cam 148, and will be measured also by the rate of rotation of the cam under the influence of motor 150. The configuration of cams 147 and 148 may be made variable, in a manner not shown herein, but which is specifically illustrated in Figs. 17 and 18 and set forth in the specification of my parent application above referred to. This actuation of the motor 143 will be of an intermittent character and will be only for a predetermined variable time during each single revolution of cam 148. This will cause but a small correction in the range of thermostat A due to a small variation between the temperature of the ware adjacent to the thermostat A' and the predetermined range of that thermostat. If this small variation continues in approximately the same degree, when the cams have made a single revolution, the motor 150 will be maintained in operation due to contact spring 156 and contact point 165 being still in engagement and the small correction of the range of thermostat A by motor 143 controlled by cam 148 will be repeated. Furthermore, this small correction will be repeated as long as the above conditions exist. If, however, the correction on the first or some subsequent revolutions of the cams 147, 148 and 149 furnishes a sufficient correction of the range of thermostat A, the contact member 144 will return to its neutral position and the motor 150 will stop after the cams have completed a complete revolution, as above described. The timing of the intermittent range corrections above described and operated by motor 150 is designed to be such that the cams will make a single revolution in the time ware passes between thermostats A and A' plus the time for heat to be transmitted from the heating elements 100, 101, 102 and 103 to the ware and therefrom to thermostat A', so that if the initial correction is sufficient, no further correction will be made until the ware acted upon by the preconditioning means as corrected has time to influence thermostat A'.

If, however, the variation between the temperature of the ware and the set range of thermostat A' is relatively larger in degree, so that the contact member 144 is moved still further to the right, as shown in Fig. 2, contact spring 152 will engage contact point 161, which will complete a continuous circuit to the motor 143 for the time contact spring 152 and contact point 161 remain in engagement. This continuous circuit may be traced by beginning with one side of the line, wire 158, through wire 159, contact member 144, contact spring 152, contact point 161, a portion of wire 182, wire 180, motor 143, and wire 178 back to the other side of the line, wire 157. Thus the correction of the range of thermostat A effected by the motor 143 will be continuous as long as the contact spring 152 remains in engagement with contact point 161.

Assuming now that the contact member 144 is in its extreme right hand position, as seen in Fig. 2, and contact springs 152, 154 and 156 are all engaged with their respective contact points 161, 163 and 165. If now the correction of thermostat A made as above described is sufficient, and the ware is sufficiently heated, so that thermostat A' is influenced by the heated ware and commences to move the contact member 144 toward the left from its extreme right hand position, the first action occurs when the contact spring 152 breaks contact with its point 161. At this time the continuous operation of the motor 143 is brought to an end and the motor may be operated solely under the intermittent operated means, including the cam 148 and the switch controlled thereby.

Upon further movement of the contact member 144 to the left, contact spring 156 will break from its contact point 165, thus opening the circuit through the motor 150 other than that maintained by the maintaining switch including cam 149, but having no effect upon the intermittent operation of the motor 143, which at this time is controlled solely by the switch responsive to cam 148. Under these circumstances, however, the cams 147, 148 and 149 will be stopped as soon as the motor 150 has moved them to such a point that the cam follower 171 drops into the notch in cam 149.

Upon further movement of the contact member 144 to the left, as seen in Fig. 2, contact spring 154 will break from its corresponding contact point 163, which will open the circuit through the motor 143, whether or not the hump or protrusion on cam 148 is in alignment with its follower. However, in this event, if the three cams have not ceased rotating, the rotation for the single revolution will be completed by the motor 150 under the control of the maintaining switch including cam 149. The contact member 144 has now assumed neutral position and the original position is regained.

If, however, the glass is still too hot and the contact member 144 continues to be moved to the left, as seen in Fig. 2, from its neutral position, the first occurrence is the engagement of contact spring 153 with contact point 162, which is above described with respect to the engagement of contact spring 154 with contact point 163, will have no effect, due in this case, however, to the fact that the switch, including contacts 172 and 173 are out of engagement.

Upon further movement of the contact member 144 to the left as seen in Fig. 2, the motor 150 will be started in the same manner and in the same direction as above described in connection with the engagement of contact spring 156 and contact point 165 and also it will be maintained in operation by the maintaining switch including cam 149 in exactly the same manner.

In this case, however, and shortly after the cams 147, 148 and 149 have been set in rotation, the motor 143 will be operated intermittently for short but variable periods in the opposite direction, in the same manner as above described in connection with the use of cam 148. The circuit for this intermittent operation in the opposite direction may be traced as follows: starting from one side of the line, wire 158, through wire 159, contact member 144, contact spring 153, contact point 162, wire 176, contact point 173, contact point 172, wire 181, wire 179, motor 143, and wire 178 back to the other side of the line, wire 157. Thus the motor will be operated intermittently in the opposite direction, but in a corresponding manner to that above described.

Upon further movement of the contact spring 144 to the left, as seen in Fig. 2, contact spring 151 will engage contact point 160, completing a continuous circuit through the motor 143 in the same direction as its intermittent rotation, which has just been described, the circuit here being traceable as follows: starting from one side of the line, wire 158, through wire 159, contact member 144, contact spring 151, contact point 160, wire 179, motor 143, and wire 178 back to the other side of the line, wire 157.

This continuous operation of the motor 143 is exactly analogous to that above described except that it is in the opposite direction.

The return of the contact member 144 from its extreme left-hand position back to neutral is accompanied by operations corresponding to those described above in connection with its return from its extreme right hand position back to neutral.

It will be noted that as the motor 143 influences the setting of the range of thermostat A in response to the temperature recorded by thermostat A', it does it by varying the relative position between the threaded rod 135 and member 138. This is effective and it has been found in practice to result in the direct movement of the contact member 123 as the thermostat A may vary but little while its range is being adjusted by the motor 143. As a result it often happens that the operation of the primary circuit is sometimes caused substantially directly by the operation of motor 143 which is controlled, as above described, by the secondary circuit. In other words, it may be considered that the secondary thermostat A' is effective to control in an intermittent or continuous manner, or both, the operation of the temperature affecting means which include the dampers 89 and 95 and the heating coils 100 to 103 inclusive.

Inasmuch as certain of the methods and apparatus above described in detail may be varied without departing from the spirit of the invention, I do not wish to be limited except by the scope of the appended claims, which are to be construed as broadly as the state of the prior art permits.

I claim:

1. The method of regulating the temperature of continuously moving material and bringing it to a predetermined temperature, comprising the steps of causing the material to move along an enclosed path, regulating the temperature in a zone in said enclosed path in response to variations in the temperature at a point subject both to the temperature regulated and the temperature of the material from a range of temperatures, similarly and intermittently varying the position of both limits of said range in the temperature scale in response to relatively small variations in the temperature of the material from a predetermined temperature range at a point in its path beyond said zone, and similarly and continuously varying both limits of the first-named range in response to relatively larger variations in the temperature of the material at the last-named point from the last-named predetermined temperature range.

2. The method of regulating the temperature of continuously moving material and bringing it to a predetermined temperature, comprising the steps of causing the material to move along an enclosed path, alternatively and positively supplying heat to or abstracting heat from a zone in said enclosed path in response to variations in the temperature from a range of temperatures, at a point subject both to the temperature in said zone and the temperature of said material, similarly and intermittently varying the position of both limits of said range in the temperature scale in response to relatively small variations in the temperature of the material from a predetermined temperature range at a point in its path beyond said zone, and similarly and continuously varying both limits of the first named range in response to relatively larger variations in the temperature of the material at the last-named point from the last-named predetermined temperature range.

3. Apparatus for varying and controlling the temperature of continuously moving material, comprising a structure defining an enclosed path for such material, means for varying and controlling the temperature within said structure, temperature responsive means positioned at a predetermined point in said structure for controlling the said temperature varying means in response to variations in the temperature at said point from a range of temperatures, a second temperature responsive means located at a point in said structure spaced from the first-named point for varying both limits of said range similarly in response to variations in the temperature at the second-named point from a predetermined temperature range, and means associated with the last-named temperature responsive means for rendering its operation in varying the limits of the first-named range intermittent for relatively small variations between the temperature at the second-named point and the predetermined range of the last-named temperature responsive means, and continuous for relatively larger variations.

4. Apparatus for alternatively raising or lowering the temperature of continuously moving material, comprising a structure defining an enclosed path for such material, means for positively raising or lowering the temperature alternatively within said structure, temperature responsive means positioned at a predetermined point in said structure and subject at least partially to the temperature of the said temperature raising or lowering means for controlling the said temperature raising or lowering means in response to variations in the temperature at said point from a range of temperatures, a second temperature responsive means located at a point in said structure unaffected directly by the said temperature raising or lowering means for varying both limits of said range simultaneously in response to variations in the temperature at the second-named point from a predetermined temperature range, and means associated with the last-named temperature responsive means for rendering its action in varying the limits of the first-named range intermittent for relatively small variations between the temperature at the second-named point and the predetermined range of the last-named temperature responsive means, and continuous for relatively larger variations.

5. Apparatus for varying and controlling the temperature of continuously moving material, comprising a structure defining an enclosed path for such material, means for varying and controlling the temperature within said structure, temperature responsive means positioned at a predetermined point in said structure for controlling the said temperature varying and controlling means in response to differences between the temperature at said point from a range of temperatures, a second temperature responsive means located at a point in said structure spaced from the first-named point for varying both limits of said range similarly in response to variations in the temperature at the second-named point from a predetermined temperature range, and means associated with the last-named temperature responsive means for rendering its action in varying the limits of the first-named range intermittent for relatively small variations between the temperature at the second-named point and the predetermined range of the last-named temperature responsive means, and continuous for relatively larger variations, the last-named means comprising an electric motor arranged to vary the adjustment of the first-named temperature responsive means to cause it to operate between different limits and thereby to adjust the position of the range thereof in the temperature scale, means actuated by the second-named temperature responsive means for operating said motor intermittently in either direction when said variations are relatively small, and means for operating said motor continuously in either direction when said variations are relatively larger.

6. Apparatus for controlling the temperature of material which moves substantially continuously in a predetermined path by alternatively supplying heat to or abstracting heat from the material, comprising a thermostat positioned at such a point as to be responsive jointly to the temperature of the heat supplying or abstracting means and to the temperature of the material adjacent to the point at which the thermostat is located for selectively and automatically controlling the supplying or abstracting of heat to or from the material in response to variations between the temperature at said thermostat and a temperature range, a second thermostat positioned at a point spaced from the first named thermostat to be responsive predominantly to the temperature of the material for varying both limits of the range of the first named thermostat similarly, a reversible electric motor, electric circuits controlled by the second named thermostat for operating said motor similarly to vary both limits of the range of the first named thermostat, and means actuated by the second named thermostat for completing circuits intermittently to said motor to operate it in one direction or the other in response to relatively slight variations of the temperature at said second named thermostat from its predetermined range in one direction or the other respectively, and means actuated in response to relatively larger variations in one direction or the other in the temperature at said second named thermostat from its predetermined range for completing circuits to said motor to actuate it continuously in one direction or the other respectively.

HAROLD A. WADMAN.